June 1, 1937.  J. BIJUR  2,081,907
LUBRICATING APPARATUS
Filed April 5, 1929
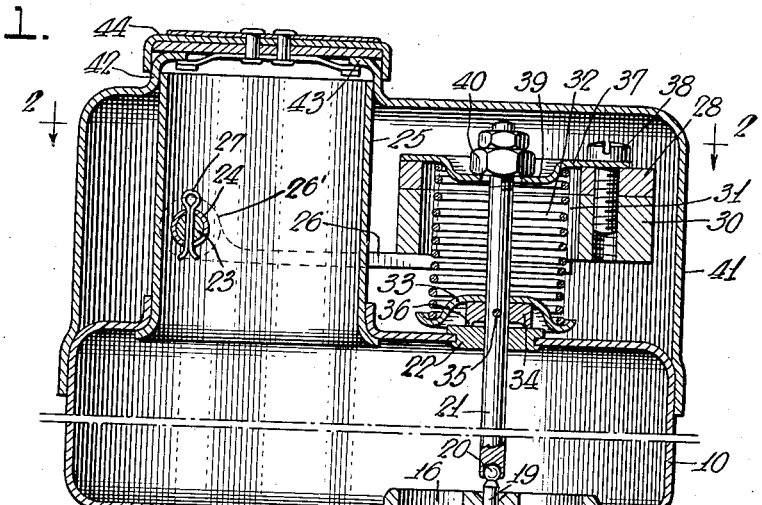
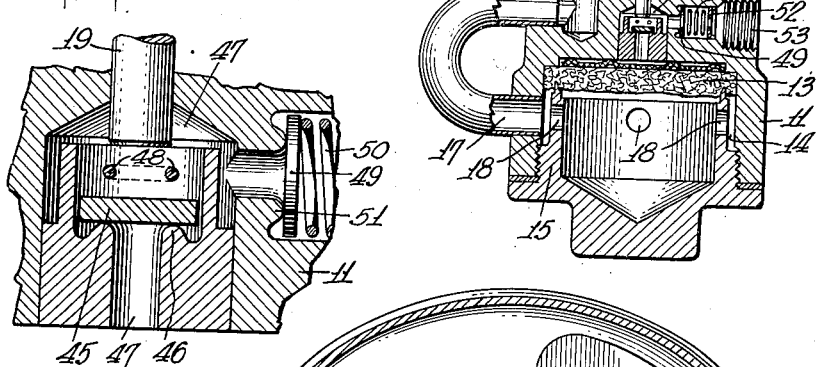
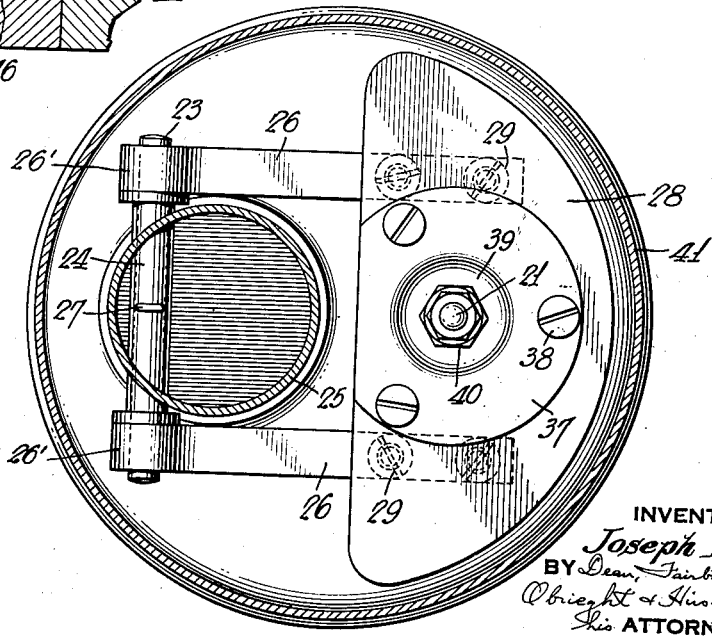
INVENTOR
Joseph Bijur.
BY
his ATTORNEYS.

Patented June 1, 1937

2,081,907

UNITED STATES PATENT OFFICE 2,081,907

LUBRICATING APPARATUS

Joseph Bijur, New York, N. Y., assignor to Auto Research Corporation, a corporation of Delaware Application April 5, 1929, Serial No. 352,744

29 Claims. (Cl. 184—26)

The present invention is concerned primarily with inertia operated automatic pumps and has its preferred application to supply installations for central chassis lubricating systems of automobiles.

Among the objects of the invention are to provide an installation of the above character serving to supply clean lubricant to the chassis bearings substantially continuously and automatically, and in accordance with requirements throughout the movement of the vehicle and by which the feed of lubricant to the bearings is arrested at other times.

According to the present invention a transmission link connects the inertia weight direct to the plunger pump. Preferably the weight is resiliently sustained, so that in its swing it will acquire inertia prior to taking the load of the lifted plunger.

As a feature of the present invention, the inertia weight is disposed above the top of the reservoir and is hingedly mounted, the hinge being arranged to intercept lubricant during the filling operation.

In the accompanying drawing in which are shown one or more of various possible embodiments of the several features of this invention, Fig. 1 is a view in longitudinal cross-section through a preferred embodiment, the middle being broken away, Fig. 2 is a sectional view taken on line 2—2 of Fig. 1 and Fig. 3 is a detail on an enlarged scale showing the inlet valve, and the outlet valve.

Referring now to the drawing, there is shown a sheet metal reservoir 10 having a pump block 11 telescoped and preferably soldered into the downturned flange 12 of a corresponding opening in the bottom. The block has a filter disk 13 in the lower cavity 14 thereof peripherally clamped by a hollow closure cap 15 therebelow, into which lubricant drains by gravity flow from the reservoir through the depression 16 and by way of U pipe 17, the flange of the screw cap being perforated at 18 and spaced from the block to permit such entry. Axially of the block 11 is a bore of small diameter, constituting a pump cylinder filled with a corresponding plunger 19 to which is connected by a ball and socket joint 20 a vertical rod 21 extending upward through a bushing 22 in the top of the reservoir.

The specific pump operating means in this instance is an inertia weight preferably of composite construction. A transverse cross pin bearing 23 is affixed by a cotter pin 27 in a sleeve 24 fixed transversely of the filling neck 25 and having pivoted upon the extremities thereof the eyes 26' of a pair of carrying arms 26, to outer ends of which the inertia weight is attached. The aperture for cotter pin 27 permits the ready entry of lubricant during the filling or charging operation, which lubricant spreads to oil the bearing between the pin 23 and the support eyes 26', thereby rendering the oscillations of the weight relatively frictionless.

The weight comprises a light segmental support plate 28 secured by screws 29 to the arms 26 and sustaining thereon cylindrical masses 30 of thick metal. The support plate and the weight plates have a large vertical bore 31 therethrough which accommodates a coil spring 32 resiliently sustaining the weight. The coil spring rests upon a sheet metal spring carrier 33 in turn resting upon a collar 34 pinned as at 35 to the operating rod and having a support flange 36 normally resting on the bushing 22. The weight has a sheet metal cover 37 secured thereto by screws 38 and countersunk as at 39 to form a retainer for the upper or outer portion of the coil spring 32. Threaded upon the extremity of the rod 21 are a pair of adjustable nuts 40 the setting of which will determine the stroke of the pump piston.

The weight is preferably protected by an enclosing removable cover 41 telescoped over the reservoir and having a hub 42 telescoped over the rim of the filling neck 25 and provided with inturned lugs 43 for key connection of the removable filling cover 44, the construction of which is not material to the invention claimed herein.

The pump preferably has a gravity intake valve 45 resting upon a seat 46 at the top of an axial passage 47 directly above the filter 13 and a pair of transverse pins 48 limit the rise of said valve under the suction stroke of the plunger. The pump block also has an outlet disk valve 49 urged by coil spring 50 against its seat 51, said spring retained in position by a friction cup 52. The socket 53 constitutes an attachment for a distributing pipe system (not shown) leading to the bearings.

During operation when the vehicle runs into a rut or drops from a protuberance or the like, the pivoted weight 30 is set in motion by inertia and in its up-stroke, aided by the expansion of the spring 32 engages nut 40 and lifts the pump plunger to draw in a charge of filtered oil past the intake valve 45. In this lifting action the entire spring 32 and its carrier 33 rise with the rod. Thereafter the weight of the inertia mass is transmitted through the spring 32 and washer 33 to exert a sustained effort on the rod for forcing the pump plunger downward, thereby closing intake valve 45, opening exit valve 49 and causing the minute charge of the pump to be ejected through socket 53 into the distributing pipe line.

The distributing system is preferably similar to that of my Patents No. 1,732,212 and No. 1,746,139 dated October 15, 1929, and February 4, 1930, respectively, being equipped largely or entirely with drip plugs of valveless or suction seated valve type, so that no given initial pressure need be exerted by the pump to cause emission to the bearings. Thus, the pump will serve as a constant volume pump, ejecting its charge into the system and evolving such pressure as may be needed for that purpose, low pressure in summer and higher pressure in winter. The pump being of minute volume, the relatively frequent oscillations of the weight will cause propulsion of sufficient lubricant to meet the requirements of the lubricated mechanism.

Having thus described my invention, what I claim as new and desire to secure by Letters Patent is:—

1. An automatic supply installation for a central lubricating system, with a plurality of highly restricted flow proportioning outlets comprising a reservoir, a plunger pump of minute volume near the bottom thereof and operating means near the top thereof, said means comprising a pivoted inertia operated weight and a rod operatively and directly connecting said weight to said plunger, whereby said plunger and said weight will reciprocate upwardly and downwardly simultaneously in phase with each other, said rod and said plunger being so connected to said weight as to permit slight relative movements and said connection being located at an intermediate portion of said weight and at a position substantially removed from said pivot with the result that the length of the effective discharge stroke will be less than the maximum stroke of said weight.

2. An automatic supply installation for a central lubricating system, with a plurality of highly restricted flow proportioning outlets comprising a reservoir, a plunger pump of minute volume near the bottom thereof and operating means near the top thereof, said means comprising a pivoted inertia operated weight, a rod operatively and directly connecting said weight to said plunger, and a removable cover encircling said reservoir, whereby said plunger and said weight will reciprocate upwardly and downwardly simultaneously in phase with each other, said rod and said plunger being so connected to said weight as to permit slight relative movements and said connection being located at an intermediate portion of said weight and at a position substantially removed from said pivot with the result that the length of the effective discharge stroke will be less than the maximum stroke of said weight.

3. A supply installation for a central lubricating system with a plurality of highly restricted flow proportioning outlets comprising a lubricant reservoir having a top, a substantially vertical minute pump plunger near the bottom of the reservoir, a substantially vertical operating rod connected to said plunger and extending through said top, an inertia weight pivotally mounted over said top, said weight having a part encircling said rod and a stop nut on top of said rod, serving to transmit lifting impulse to the latter upon upward stroke of said weight, whereby said plunger and said weight will reciprocate upwardly and downwardly simultaneously in phase with each other, said rod and said plunger being so connected to said weight as to permit slight relative movements and said connection being located at an intermediate portion of said weight and at a position substantially removed from said pivot with the result that the length of the effective discharge stroke will be less than the maximum stroke of said weight.

4. A supply installation for a central chassis lubricating system with a plurality of highly restricted flow proportioning outlets comprising a reservoir, an inertia weight unit having a pivot mount at one end thereof, above the top of said reservoir, a minute vertical plunger pump near the bottom of said reservoir, connecting means extending through said top and connecting said pump with said weight, said connecting means having an adjustable nut at the upper end thereof, engaged by the upper surface of said weight in the lifting movement of the latter, whereby said plunger and said weight will reciprocate upwardly and downwardly simultaneously in phase with each other, said rod and said plunger being so connected to said weight as to permit slight relative movements and said connection being located at an intermediate portion of said weight and at a position substantially removed from said pivot with the result that the length of the effective discharge stroke will be less than the maximum stroke of said weight.

5. A supply installation for a central chassis lubricating system with a plurality of highly restricted flow proportioning outlets comprising a reservoir, an inertia weight unit having a pivot mount at one end thereof above the top of said reservoir, a minute vertical plunger pump near the bottom of said reservoir, connecting means extending through said top and connecting said pump with said weight, said connecting means having an adjustable nut at the upper end thereof, engaged by the upper surface of said weight in the lifting movement of the latter, and a coil spring intervening between the reservoir top and the lower surface of said weight and resiliently sustaining the latter, whereby said plunger and said weight will reciprocate upwardly and downwardly simultaneously in phase with each other, said rod and said plunger being so connected to said weight as to permit slight relative movements and said connection being located at an intermediate portion of said weight and at a position substantially removed from said pivot with the result that the length of the effective discharge stroke will be less than the maximum stroke of said weight.

6. A supply installation for a central chassis lubricating system with a plurality of highly restricted flow proportioning outlets comprising a reservoir, an inertia weight unit having a pivot mount at one end thereof above the top of said reservoir, a minute vertical plunger pump near the bottom of said reservoir, connecting means extending through said top and connecting said pump with said weight, said connecting means having an adjustable nut at the upper end thereof, engaged by the upper surface of said weight in the lifting movement of the latter, a coil spring intervening between the top of the reservoir and the lower surface of said weight and resiliently sustaining the latter, said coil spring having a vertical axis and being disposed near the outer or free edge of said weight, whereby said plunger and said weight will reciprocate upwardly and downwardly simultaneously in phase with each other, said rod and said plunger being so connected to said weight as to permit slight relative movements and said connection being located at at an intermediate portion of said weight and at a position substantially removed from said pivot with the result that the length of the effective discharge stroke will be less than the maximum stroke of said weight.

7. A lubricant reservoir for an automatic central lubricating system, with a plurality of highly restricted flow proportioning outlets, said reservoir including a downwardly extending pump block, a pump plunger continuously enclosed therein, a rod pivotally connected to said plunger and protruding through the cover of said reservoir and an inertia weight pivoted above said reservoir and coacting with said rod to cause direct reciprocation thereof, whereby said plunger and said weight will reciprocate upwardly and downwardly simultaneously in phase with each other, said rod and said plunger being so connected to said weight as to permit slight relative movements and said connection being located at an intermediate portion of said weight and at a position substantially removed from said pivot with the result that the length of the effective discharge stroke will be less than the maximum stroke of said weight.

8. The combination of a lubricant reservoir, a minute pump having a vertical plunger in the bottom thereof, an operating rod for said plunger extending upward through the top of said reservoir, an inertia weight pivoted above the top of said reservoir, means resiliently sustaining said weight and an adjustable nut on the upper end of said rod in the path of oscillation of said inertia weight, whereby said plunger and said weight will reciprocate upwardly and downwardly simultaneously in phase with each other, said rod and said plunger being so connected to said weight as to permit slight relative movements and said connection being located at an intermediate portion of said weight and at a position substantially removed from said pivot with the result that the length of the effective discharge stroke will be less than the maximum stroke of said weight.

9. A supply installation for an automatic central lubricating system, said installation including a minute pump near the bottom thereof, an operating inertia weight having a pivot mount above the top of said reservoir, transmission means for direct connection between said weight and said pump, a filling neck extending upward from the reservoir top, the pivot mount of said weight being exposed through said neck to become lubricated during the operation of filling the reservoir.

10. A supply installation for a central lubricating system including a reservoir, a minute pump near the lower end thereof, an operating inertia weight above the top thereof, a connecting rod between said weight and said pump, a coil spring resiliently sustaining said weight and means carried by said rod and sustaining said spring.

11. A supply installation for a central lubricating system including a reservoir, a minute pump near the lower end thereof, an operating inertia weight pivoted at one end above the top thereof, and having the major part of its weight near the outer or free end thereof, a connecting rod between said weight and said pump, a coil spring resiliently sustaining said weight and means carried by said rod and sustaining said spring.

12. A supply installation for a central chassis lubricating system including a reservoir, a pump block near the lower end thereof, a pump plunger therein, a rod extending upward therefrom through the top of said reservoir, said rod having a flange normally resting upon the reservoir and determining the end of the operative pump stroke, a spring carrier sustained on said flange, a coil spring resting on said carrier, an inertia weight sustained by said coil spring, and a nut on the upper end of said rod through which the latter is lifted in the upward stroke of the weight.

13. A supply installation for a central lubricating system comprising a reservoir, a pump block near the lower end thereof, a pump plunger therein, a rod connected to said plunger and extending upward through a bushing in the reservoir top, an enlargement rigid with said rod normally resting on said bushing, a pivotally mounted inertia weight having an aperture therein about said rod, a coil spring in said aperture, a spring carrier resting on said enlargement and sustaining said spring, said weight sustained upon said spring and an adjustable nut on the upper end of said rod through which the lifting action of the weight is transmitted to the rod and plunger.

14. A lubricant supply installation for attachment to a road vehicle comprising a pump cylinder unit fixed with respect to the vehicle and a plunger unit moving with irregularities in the road, said first unit including a vertical cylindrical container with an intermediate horizontal partition, the lower portion of which cylindrical container below said partition serving as a lubricant reservoir, and a vertical pump cylinder positioned adjacent the bottom of said cylindrical container and supported rigidly from said cylindrical container, and said plunger unit comprising a weight enclosed within the container above said partition and downwardly extending rod means passing through said partition and insertable into said pump cylinder at its lower end, said plunger unit being supported upon said partition on opposite sides of said weight respectively, by a pivotal mount and by a spring, the connection of said rod means to said weight being substantially closer to the spring support than to the pivotal mount.

15. An automatic supply installation for a central lubricating system with a plurality of highly restricted flow proportioning outlets, comprising a reservoir, a plunger pump of minute volume near the bottom thereof and operating means near the top thereof, said means comprising a pivoted inertia actuated weight, a rod operatively and directly connecting said weight to said plunger, and a spring resiliently supporting said weight, said rod being provided with attachment means at its upper end to the weight and at its lower end to the plunger permitting slight relative movements between the weight and the plunger and the respective adjacent ends of the rod, the amplitude of the effective charging and discharging strokes of the plunger being substantially less than the maximum amplitude of reciprocation of the weight, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

16. An automatic supply installation for a central lubricating system with a plurality of highly restricted flow proportioning outlets, comprising a reservoir, a plunger pump of minute volume near the bottom thereof and operating means near the top thereof, said means comprising a pivoted inertia actuated weight, a rod operatively and directly connecting said weight to said plunger, and a coil spring sustained substantially on top of said reservoir and in turn resiliently supporting said weight, said rod being provided with attachment means at its upper end to the weight and at its lower end to the plunger permitting slight relative movements between the weight and the plunger and the respective adjacent ends of the rod, the amplitude of the effective charging and discharging strokes of the plunger being substantially less than the maximum amplitude of reciprocation of the weight, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

17. In a reservoir for an automatic central chassis lubricating system with a plurality of highly restricted flow proportioning outlets, an inertia operated weight, comprising a pivotally connected lever means having a horizontal pivot axis near one end thereof, and weight plates secured to said lever means near the outer end of the latter, said weight plates having a plurality of apertures therethrough respectively for operative connection of said weight with a pump to be actuated thereby and close connection of said plates together and coil spring means resiliently sustaining said weight to take a normal, at rest, position substantialy above the horizontal pivot axis.

18. A reservoir having a plunger pump secured at the bottom thereof, a cover for said reservoir, a weight mounted above the cover thereof, a coil spring resiliently sustaining said weight upon said cover and a rod extending through said weight and connected at its lower end to said plunger, a connecting element rigid with and projecting from said weight and a connecting element rigid with and projecting from said rod, said connecting elements projecting toward each other for operative contact therebetween, and means at the place of said operative contact to permit slight relative movements between said connecting elements, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

19. A reservoir for an automatic central lubricating system with a plurality of highly restricted flow proportioning outlets having an associated operating pump, an upper wall and an inertia weight supported on said upper wall, an operating rod connected between said weight and said pump passing through said upper wall, a cover member telescoped over said reservoir and said upper wall and enclosing said weight and a filling neck secured to said upper wall extending upward through and above said cover member past the inertia weight.

20. An automatic supply installation for a central lubricating system with a plurality of highly restricted flow proportioning outlets comprising a reservoir, a plunger pump of minute volume near the bottom thereof, an inertia operated weight and a rod operatively and directely connecting said weight to said plunger and being attached to both said weight and said plunger, said weight being pivotally mounted on a part rigid with the reservoir and being resiliently mounted by a spring, the attachment at the upper end of the rod to the weight and at its lower end to the plunger permitting slight relative movements between the weight and the plunger and the respective adjacent ends of the rod, the amplitude of the effective charging and discharging strokes of the plunger and connecting rod being substantially less than the maximum amplitude of reciprocation of the weight, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

21. An automatic supply installation for a central lubricating system with a plurality of highly restricted flow proportioning outlets, comprising a reservoir, a plunger pump of minute volume near the bottom thereof, an inertia operated weight and a rod operatively and directly connecting said weight to said plunger, said weight being provided with a pivotal mounting rigid with the reservoir and at another place being provided with a resilient mounting consisting of a spring, the direct connection of said weight to said plunger causing opposition to downward movement of the weight, due to displacement of the body of lubricant in said plunger pump into the lubricating system, said rod being provided with attachment means at its upper end to the weight and at its lower end to the plunger permitting slight relative movements between the weight and the plunger and the respective adjacent ends of the rod, the amplitude of the effective charging and discharging strokes of the plunger being substantially less than the maximum amplitude of reciprocation of the weight, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

22. An automatic supply installation for a central lubricating system with a plurality of highly restricted flow proportioning outlets, comprising a reservoir, a plunger pump of minute volume near the bottom thereof and operating means near the top thereof, said means comprising a pivoted inertia operated weight and a rod operatively and directly connecting said weight to said plunger, said rod and said plunger being so connected to said weight as to permit slight relative movements and said connection being located at an intermediate portion of said weight and at a position substantially removed from said pivot, said plunger pump being continuously contained in and operating in a fixed cylinder rigidly connected to the reservoir, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

23. An automatic supply lubrication for a central lubricating system with a plurality of highly restricted flow proportioning outlets, comprising a reservoir, a plunger pump of minute volume near the bottom thereof, a rod operatively and directly connecting said weight to said plunger, said rod being provided with attachment means at its upper end to the weight and at its lower end to the plunger permitting slight relative movements between the weight and the plunger and the respective adjacent ends of the rod, and means for regulating the relative positions of said weight and said plunger, the plunger moving proportionately slower than the center of gravity of the weight throughout the concurrent movement of the weight and the plunger, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

24. An automatic supply installation for a central lubricating system with a plurality of highly restricted flow controlling outlets, comprising a reservoir, a pivotally mounted inertia operated weight near the top thereof, a vertically reciprocating plunger pump operatively and directly connected to said weight and a connecting rod between said weight and said plunger converting the reciprocating arcuate motion of the weight into reciprocating linear movement of the plunger, said rod being provided with attachment means at its upper end to the weight and at its lower end to the plunger permitting slight relative movements between the weight and the plunger and the respective adjacent ends of the rod, the amplitude of the effective charging and discharging strokes of the plunger being substantially less than the maximum amplitude of reciprocation of the weight, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

25. A lubricant supply installation comprising an outer casing serving as a reservoir, an upper cover and a lower cover for said outer casing, a lubricant inlet in the lower cover, a pump including a cylinder rigidly supported in respect to said outer casing, a plunger in said cylinder, an inlet passage to said cylinder, an outlet passage from said cylinder, a valve in said outlet passage opening upon downward movement of said plunger within said cylinder to permit discharge of the contents of said cylinder, said inlet passage substantially immediately and automatically being closed upon initiation of downward discharging movement of said plunger within said cylinder, an upward extending connection from said plunger, said connection passing through said lower cover, a weight attached to the upper end of said connection, a horizontal pivotally mounted lever means, the pivotal mount for which is substantially removed from said weight, the attachment of the connection to the weight permitting slight relative movements between the weight and the connection, a resilient spring means supporting said weight, said resilient support retarding the down stroke of said weight and plunger due to its resultant compression and assisting upstroke of said plunger due to its subsequent expansion, whereby said upstrokes will be more rapid than said downstrokes, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

26. A lubricant supply installation comprising an outer casing serving as a reservoir, an upper cover and a lower cover for said outer casing, a lubricant inlet in the lower cover, a pump including a cylinder rigidly supported in respect to said outer casing, a plunger in said cylinder, an inlet passage to said cylinder, an outlet passage from said cylinder, a valve in said outlet passage opening upon downward movement of said plunger within said cylinder to permit discharge of the contents of said cylinder, said inlet passage being immediately and automatically closed upon initiation of downward discharging movement of said plunger within said cylinder, an upward extending connection from said plunger, said connection passing through said lower cover, a weight attached to the upper end of said connection, a horizontal pivotally mounted lever means, the pivotal mount for which is substantially removed from said weight, the attachment of the connection to the weight permitting slight relative movements between the weight and the connection, a resilient spring means supporting said weight, the resilient spring means and the pivotal mount for said lever means being positioned above the lower cover of the casing and below the upper cover of the casing, said resilient support retarding the down stroke of said weight and plunger due to its resultant compression and assisting upstroke of said plunger due to its subsequent expansion, whereby said upstrokes will be more rapid than said downstrokes and said resilient support permitting initial downward movement of the weight without corresponding amplitude of movement of the plunger, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

27. In a lubricating installation, a pump and reservoir unit having a reservoir enclosure provided with a covering upper wall having an inlet opening for lubricant, a relatively large massive inertia-weight-motor including a pivotally mounted swinging weight and a floating spring supporting the same in floating position above said covering upper wall, a cylindrical thin elongated metallic plunger as compared to the weight, a casing for said weight-motor located above the lubricant level in said reservoir enclosure and above said upper wall and a pump block with a vertical cylindrical bore receiving said plunger located closely adjacent the bottom of said enclosure, said weight and said plunger being directly operatively connected together so that said weight will move said plunger both upwardly and downwardly to respectively take charging and discharging strokes, said cylindrical bore being provided with a lower portion into which lubricant is sucked from said reservoir upon upward motion of the plunger and from which it is discharged into the piping system upon downward motion of the plunger and also being provided with an upper portion serving as a guide for the plunger and further being provided with inlet and outlet ports, one of which extends transversely toward said lower portion and the other of which extends axially from the bottom of said lower portion, the outlet port being provided with a spring-seated outlet check valve and the inlet port being provided with a filter element, said weight when at rest, floating in an elevated position, said plunger being located in said bore with its lower end adjacent said lower portion of said bore, said weight in its reciprocation above and below said elevated floating position having a substantially greater movement than the effective movement and stroke of the plunger in charging and discharging; said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

28. In an automobile chassis drip plug lubricating installation, a pump and reservoir unit having a reservoir enclosure provided with a covering upper wall having an inlet opening for lubricant, a reciprocating automatically actuated motor including a floating motor element and a coil spring maintaining the same in floating position above said covering upper wall, a thin cylindrical elongated metallic plunger, a casing for said motor element located above the lubricant level in said reservoir enclosure and above said upper wall, and a pump block with a vertical cylindrical bore receiving said plunger located closely adjacent the bottom of said enclosure, said motor element and said plunger being directly operatively connected together so that said motor element will move said plunger both upwardly and downwardly to respectively take charging and discharging strokes, said connection being by a connecting rod extending down through said covering upper wall having a universal connection with respect to said plunger, said cylindrical bore being provided with a lower portion into which lubricant is sucked from said reservoir upon upward motion of the plunger and from which it is discharged upon downward motion of the plunger into the piping system and also with an upper portion serving as a guide for the plunger and further being provided with inlet and outlet ports, one of which extends transversely toward said lower portion and the other of which extends longitudinally from said lower portion, the outlet port being provided with a spring-seated outlet check valve and the inlet port being provided with a filter element, said plunger being located in said bore with its lower end adjacent said lower portion of said bore in a predetermined position, said plunger during its effective charging and discharging strokes moving upwardly and downwardly synchronized and in phase with the upward and downward movements of the element.

29. In an automobile chassis lubricating installation, a pump and reservoir unit having a reservoir enclosure provided with a covering upper wall having an inlet opening for lubricant, a relatively large massive inertia-weight-motor including a pivotally mounted swinging weight and a floating spring supporting the same in floating position above said covering upper wall, a thin elongated cylindrical metal plunger, a casing for said weight-motor and a pump block with a vertical cylindrical bore receiving said plunger located closely adjacent the bottom of said enclosure, said weight and said plunger being provided with and directly operatively connected together so that said weight will move said plunger both upwardly and downwardly to respectively take charging and discharging strokes, said connection being by a connecting rod having a threaded adjustment with respect to said weight and a universal connection to said plunger, said cylindrical bore being provided with a lower portion into which lubricant is sucked from said reservoir upon upward motion of the plunger and from which it is discharged upon downward motion of the plunger into the piping system and also with an upper portion serving as a seal and guide for the plunger and further being provided with inlet and outlet ports, said weight when at rest, floating in an elevated position, said plunger being located in said bore with its lower end adjacent said lower portion of said bore, said weight in its reciprocation having a substantially greater movement than the effective movement and stroke of the plunger in charging and discharging, said plunger making one charging stroke for each complete upward stroke of the weight and one discharging stroke for each complete downward stroke of the weight, said plunger during its effective charging and discharging strokes moving upwardly and downwardly synchronized with the upward and downward movements of the weight.

JOSEPH BIJUR.